United States Patent
Welz

(10) Patent No.: US 6,814,371 B2
(45) Date of Patent: Nov. 9, 2004

(54) COLD GAS GENERATOR FOR AN AIRBAG SYSTEM

(75) Inventor: Siegfried Welz, Fellbach (DE)

(73) Assignee: Welz Industrieprodukte GmbH, Fellbach (DE)

( * ) Notice: Subject to any disclaimer, the term of this patent is extended or adjusted under 35 U.S.C. 154(b) by 0 days.

(21) Appl. No.: 10/248,212

(22) Filed: Dec. 27, 2002

(65) Prior Publication Data

US 2003/0137136 A1 Jul. 24, 2003

Related U.S. Application Data

(63) Continuation of application No. PCT/EP01/06991, filed on Jun. 21, 2001, now abandoned.

(30) Foreign Application Priority Data

Jun. 29, 2000 (DE) .......................................... 100 31 750

(51) Int. Cl.[7] .............................................. B60R 21/26
(52) U.S. Cl. ...................................... 280/736; 280/737
(58) Field of Search ................................ 280/736, 737, 280/741, 729; 222/3

(56) References Cited

U.S. PATENT DOCUMENTS

| | | | | |
|---|---|---|---|---|
| 3,642,303 A | * | 2/1972 | Irish et al. ............... | 280/730.1 |
| 4,215,878 A | * | 8/1980 | Hirbod ...................... | 280/737 |
| 4,275,901 A | * | 6/1981 | Okada ....................... | 280/741 |
| 5,273,309 A | * | 12/1993 | Lau et al. ................. | 280/730.2 |
| 5,556,128 A | * | 9/1996 | Sinnhuber et al. ....... | 280/730.2 |
| 5,593,180 A | * | 1/1997 | Cuevas et al. ............ | 280/741 |
| 6,039,347 A | * | 3/2000 | Maynard ................... | 280/736 |
| 6,247,725 B1 | * | 6/2001 | Moller ...................... | 280/737 |
| 6,254,129 B1 | * | 7/2001 | Rink et al. ................ | 280/736 |
| 6,299,203 B1 | * | 10/2001 | Muller ...................... | 280/736 |

FOREIGN PATENT DOCUMENTS

| | | | | |
|---|---|---|---|---|
| DE | 23 24 571 | | 11/1973 | |
| DE | 42 31 522 | | 3/1994 | |
| DE | 199 29 046 | | 1/2001 | |
| EP | 765780 A1 | * | 4/1997 | ........... B60R/21/18 |

* cited by examiner

*Primary Examiner*—David R. Dunn
(74) *Attorney, Agent, or Firm*—Gudrun E. Huckett

(57) ABSTRACT

A cold gas generator for an airbag system has a storage device having an interior filled with a gas under pressure. The interior is divided into at least two partial chambers. Gas outlet openings closed in a rest state of the cold gas generator are provided, wherein one of the gas outlet openings is correlated with one of the at least two partial chambers, respectively. An opening mechanism is provided for actuating, when needed, all of the gas outlet openings together and for filling several airbags with the gas.

25 Claims, 3 Drawing Sheets

COLD GAS GENERATOR FOR AN AIRBAG SYSTEM

CROSS REFERENCE TO RELATED APPLICATIONS

This is a continuation of International Application PCT/EP01/06991 with an international filing date of Jun. 21, 2001, not published in English under PCT Article 21(2), and now abandoned.

BACKGROUND OF INVENTION

1. Field of the Invention

The invention relates to a cold gas generator for an airbag system, comprising a storage device, whose interior is filled with a gas under pressure, comprising a gas outlet opening closed in the rest state, and comprising an opening mechanism for opening the gas outlet opening when needed and for filling an airbag with the gas.

2. Description of the Related Art

Known airbag systems, as they are used in the automobile industry and as they can be used in the railway industry as well as in the airplane industry, are comprised essentially of an airbag which is folded in the rest state and can be filled with the gas when needed; a gas generator which provides the gas for filling the airbag; and a triggering device which initiates the filling of the airbag in the case of an accident when a certain limit value is surpassed. A so-called cold gas generator has a storage device filled with a gas under pressure and a gas outlet opening which is closed in the rest state and can be opened by an opening mechanism when needed for filling the airbag.

Increasing requirements with respect to safety technology demand the development of increasingly more complex airbag systems. For example, for protection against a combined frontal and side impact, the arrangement of a front airbag and a side airbag can be expedient. The aforementioned side airbag can be developed as a system of, for example, three individual airbags wherein each individual airbag is matched with regard to its properties to the body parts to be protected. The required plurality of gas generators is expensive and thus prevents the broad use of such modern safety technology. A temporally precisely coordinated filling of the individual airbags in an accident situation is difficult.

SUMMARY OF INVENTION

It is an object of the present invention to provide a cold gas generator of the aforementioned kind which enables the use of airbag systems with improved coordination and reduced cost expenditure.

In accordance with the present invention, this is achieved in that the interior of the storage device is divided into at least two partial chambers, wherein the partial chambers have correlated therewith a gas outlet opening for filling several separate airbags, respectively, and wherein the gas outlet openings can be actuated together by the opening mechanism.

By dividing the interior of the storage device into at least two partial chambers and by correlating a gas outlet opening with a partial chambers, respectively, several airbags can be filled from one storage device. By arranging an opening mechanism such that it actuates the gas outlet openings together and thus fills the separate airbags, it is ensured that with a defined triggering signal all connected airbags can be filled in a temporally adjusted way and thus provide a coordinated protective system. Moreover, it is achieved in this way that for a system of several airbags only one storage device and only one opening mechanism are required; this lowers the investment costs. Optionally, the corresponding storage device provided with several chambers can be mounted as standard equipment in a vehicle, with only a minimum number of individual airbags being connected thereto. With minimal additional expenditure, additional airbags, ordered by the customer, can be connected without the cold gas generator itself having to be modified, exchanged, or supplemented with additional cold gas generators.

In a preferred embodiment, the storage device of the cold gas generator comprises a cylindrical center part which extends along a longitudinal axis and which has a longitudinally movable piston arranged therein. The piston forms a partition for dividing the interior into two partial chambers and, in its rest position, closes a gas outlet opening of one of the two partial chambers. With this arrangement, only a simple opening mechanism must be provided which acts only on one gas outlet opening. When opening this gas outlet opening, the gas pressure in one of the partial chambers drops and, as a result of this, the piston is moved in the direction of the longitudinal axis of the storage device and thus releases the additional gas outlet opening.

Particularly in the case of an arrangement with several pistons, which separate a partial chamber from one another, respectively, and which close in the rest position a correlated gas outlet opening, respectively, several airbags of an airbags system can be filled in a simple and coordinated way because only a single opening mechanism must be actuated. In this situation, a connection of the pistons with one another by means of a piston rod is expedient. In this way, the precision of the temporal adjustment of the individual opening processes is improved. The piston rods are preferably of a tubular design because, in this way, a high buckling stability can be obtained while a minimal weight is ensured at the same time. The high buckling stability is required as a result of the occurring high gas pressures. At the same time, a minimal total mass of the moving parts is desirable because high triggering speeds in the range of a few milliseconds are required.

A simple and effective opening mechanism is realized by providing a sealing disk closing off a gas outlet opening provided at the end face of the storage device, wherein the sealing disk has a rated break-off location and is supported by a support element. For example, a pyrotechnical actuator can laterally or rotatingly move, when needed, the support element such that the sealing disk is no longer supported. The rated break-off location is dimensioned or selected such that in the unsupported state of the sealing disk it is destroyed by the gas pressure acting on it and the sealing disk thus releases the gas outlet opening.

This arrangement requires only a very minimal energy for actuation which is stored within the opening mechanism and which must realize only the movement of the support element. The actual opening of the different gas outlet openings is then realized by the energy of the gas which is stored in a compressed state within the storage device. In this connection, the high gas pressures effect an advantageously high acceleration of the piston system and, correlated therewith, a fast opening of the different gas outlet openings. In this connection, the peripheral wall of the storage device expediently has a tapering cross-section in the area of its end face which acts as a brake on the piston moving at high speed and thus prevents mechanical pulse peaks during the triggering process.

In a preferred embodiment, the piston(s) each have a connecting channel for pressure communication (pressure transfer) between the two partial chambers adjoining the piston, respectively; this ensures that in the rest state in all partial chambers of the cold gas generator identical pressure is present and, correlated therewith, the piston system is in force equilibrium.

In the connecting channels a flow throttle is arranged, respectively, so that, on the one hand, for the comparably slow filling of the storage device during the manufacturing process a pressure compensation in the individual partial chambers can take place while excessive differential pressures are prevented. In contrast to this, emptying of the gas stored in the individual partial chambers into the respective airbags is carried out comparatively very quickly. The flow throttles in the connecting channels avoid mutual effects of the separate airbags or of the corresponding partial chambers.

The piston rods are expediently secured in a blind bore in the area of the center axis of the respective piston wherein in the bottom of the blind bore the connecting channel is arranged approximately coaxially. In this way, with a single working step that can be automated the connecting channels as well as a receptacle for the piston rod can be manufactured; this keeps the manufacturing costs low and prevents a mechanical weakening of the piston.

Particularly in connection with tubular piston rods, these piston rods can also serve in such an arrangement as a gas line for a defined guiding of the gas flow during filling from the filling valve to the respective partial chambers. Moreover, for obtaining precisely defined flow conditions when triggering occurs, sealing of the pistons, in particular, by means of an O-ring, relative to the peripheral wall of the storage device is expedient. In this way, while providing a sufficient seal-tightness, an excellent gliding action between the piston and the peripheral wall is provided.

For simplifying the configuration, the gas outlet openings are expediently arranged in the peripheral wall such that they are covered by the correlated piston in its rest position. In this way, with simple means sealing of the gas outlet openings in the rest state as well as opening of the gas outlet openings when needed can be achieved.

Expediently, the gas outlet openings are closed by a sealing sleeve, respectively, wherein the sealing sleeve is comprised of a base body fastened on the peripheral wall of the storage device and a closure body which is connected to the piston. The base body and the closure body are connected to one another by a rated break-off location so that in the rest state, on the one hand, a reliable sealing of the interior of the storage device and, correlated therewith, maintaining of the desired pressure level for a sufficiently long duration is ensured. On the other hand, the gas outlet openings can be opened reliably and with minimal actuating forces when needed in that the respective piston, as described above, carries out a longitudinal movement and, when doing so, separates the closure body at the rated break-off location from the base body.

For this purpose, the base body is expediently configured as a circular disk on which a pin is provided as a unitary part thereof. The pin engages a correlated bore in the piston while the circular disk is fastened on the peripheral wall, in particular, by means of a sealing weld seam. Coaxially to the circular disk and the pin an outlet bore is provided whose diameter is somewhat smaller than the diameter of the pin and whose depth corresponds at least approximately to the thickness of the circular disk. In this way, in the area of the connecting location between the circular disk and the pin, a short thin-walled tube member is provided which forms the above mentioned rated break-off location. When the pin is sheared off, a precise gas outlet opening defined by the outlet bore is provided.

The desired shearing force at the rated break-off location can be simply and precisely determined by adjusting the pin diameter and the diameter of the outlet bore relative to one another. In this connection, the piston has at the side facing away from the outflow position advantageously a defined covering length relative to the outlet bore. The covering length for the individual pistons can be dimensioned differently so that, optionally, a temporal delay of the start of the inflation process of the individual airbags relative to one another can be controlled.

The filling gas is advantageously helium because this gas has a minimal dependency on pressure and temperature. In this way, the filling pressure of the storage device can be selected such that, on the one hand, at low ambient temperatures a safe filling of the airbags is possible and, on the other hand, for example, in the case of intensive solar radiation, the gas pressure does not excessively rise so that an overloading of the airbag at high temperatures is avoided. Moreover, helium has excellent flow properties which enable the connection of airbags via lines of a corresponding length to the storage device. In this way, positioning of the storage device, for example, at a suitable location in the vehicle is possible which does not coincide with the location of attachment of the airbags. Also, it is possible to fill several airbags located at different locations, when needed, with a central storage device by means of corresponding pressure lines. Moreover, an airbag filled with helium has excellent damping properties so that the impact load onto a person to be protected and particularly the HIC factor (Head Injury Criterion) can be reduced.

DETAILED DESCRIPTION

Figure 1:
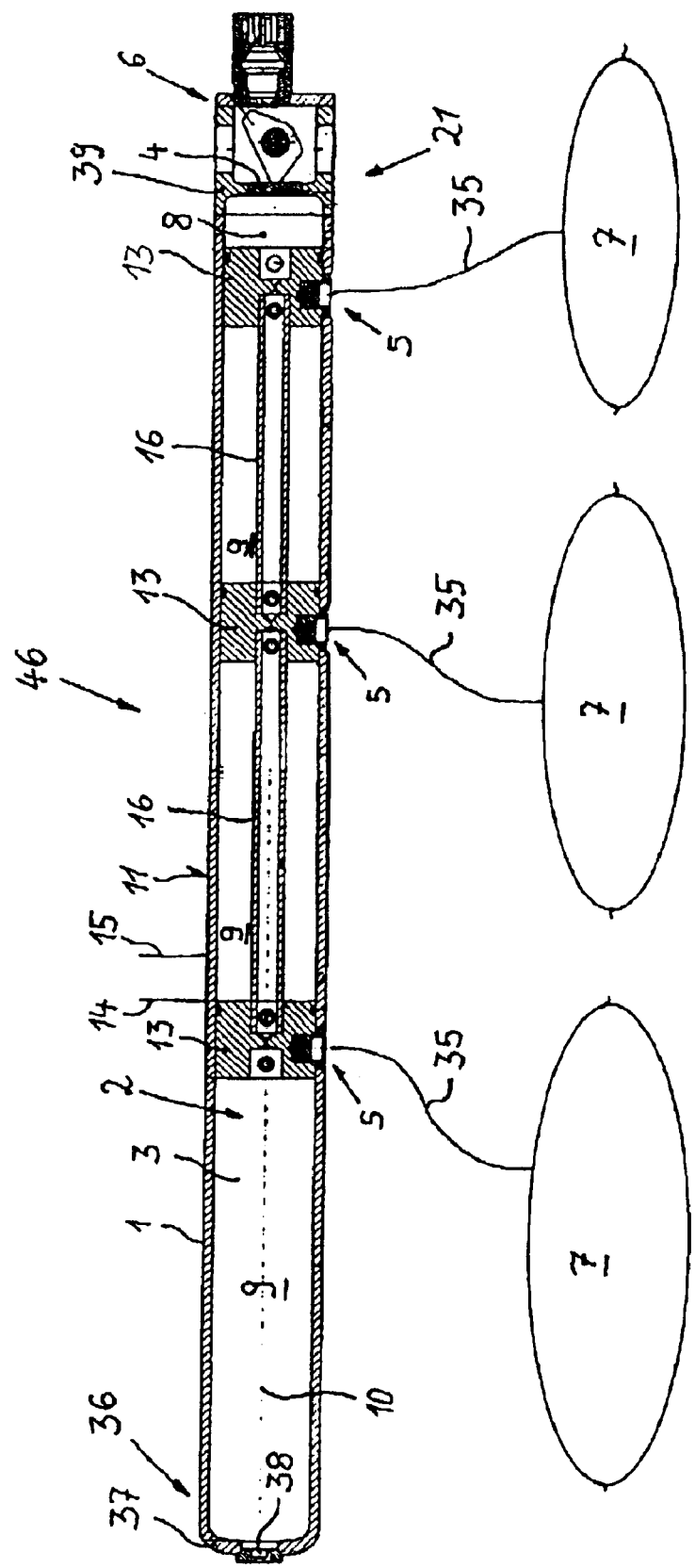
FIG. 1 is an overview illustration of a cold gas generator with schematically illustrated airbags.

FIG. 1 shows in a schematic illustration an airbag system with three separate airbags 7 which are connected by schematically illustrated pressure lines 35 to a cold gas generator 46. The cold gas generator 46 comprises a storage device 1 having an interior 2 filled with a gas 3 wherein the gas 3 is helium in the illustrated embodiment. The interior 2 is divided by three pistons 13 in a partial chamber 8 in the area of its end 21 as well as three additional partial chambers 9. The partial chamber 8 at the end 21 has a closed gas outlet opening 4. The other partial chambers 9 have correlated therewith a gas outlet opening 5, respectively, which is arranged at the periphery of the storage device 1. In the area of the end 21 an opening mechanism 6 is provided which is arranged in a trigger housing 39. The storage device 1 has at its center part 11 a cylindrical peripheral wall 12 extending along a longitudinal axis 10 which at the end 21 is closed by the trigger housing 39 and at the opposite end 36 by a lid 37. In the lid 37 a filling valve 38 is provided. The pistons 13 are connected with one another by tubular piston rods 16 and are movable together from their illustrated rest position 14 into a schematically illustrated outflow position 15 in the direction of the longitudinal axis 10.

Figure 2:
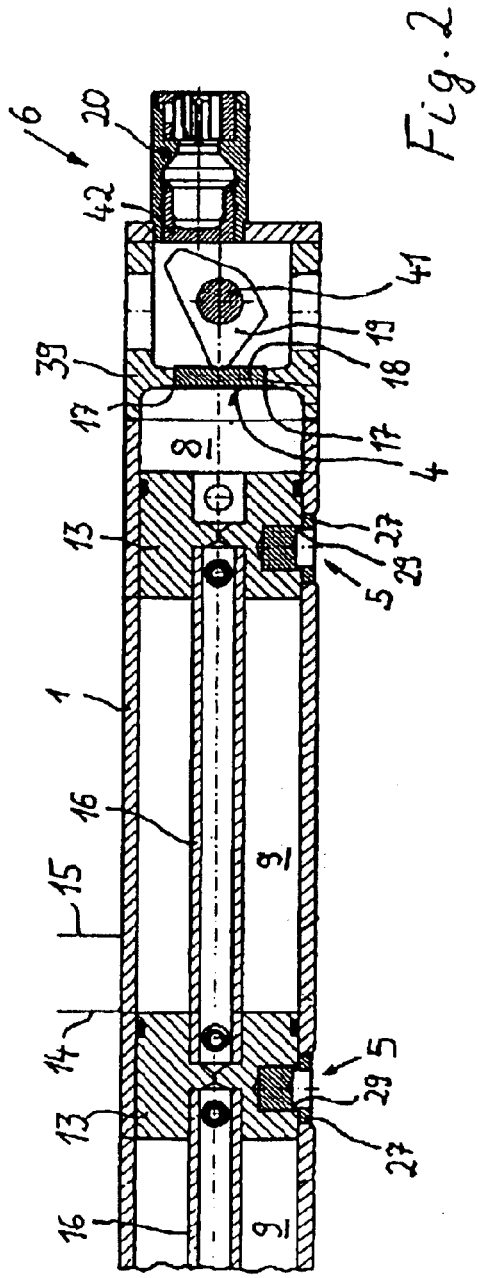
FIG. 2 is a cross-sectioned detail view of the cold gas generator according to FIG. 1 in the rest position.

FIG. 2 shows in an enlarged detail cross-section the storage device 1 in the area of the opening mechanism 6 according to FIG. 1. The opening mechanism 6 comprises a sealing disk 18 which is connected by means of a rated break-off location 17 to the trigger housing 39 and closes the gas outlet opening 4 at the end 21. The sealing disk 18 is supported relative to the gas pressure in the partial chamber 8 by means of a support element 19 which is pivotably supported on a shaft journal 41. On the side of the support element 19 opposite the sealing disk 18 a pyrotechnical actuator 20 with an impact piston 42 is arranged. When needed, it can impact on the support element 19. The partial chambers 8, 9 are filled with identical gas pressure so that the system comprised of the pistons 13 and the piston rods 16 is maintained in equilibrium. Also, an arrangement is possible wherein the piston 13 in the area of the end 21, directly or by means of an additional piston rod, is supported on the support element 19. The pistons 13 which are shown in their rest position 14 cover the peripheral gas outlet openings 5 which are closed by sealing sleeves 27 provided with a rated break-off location 29, respectively.

Figure 3:
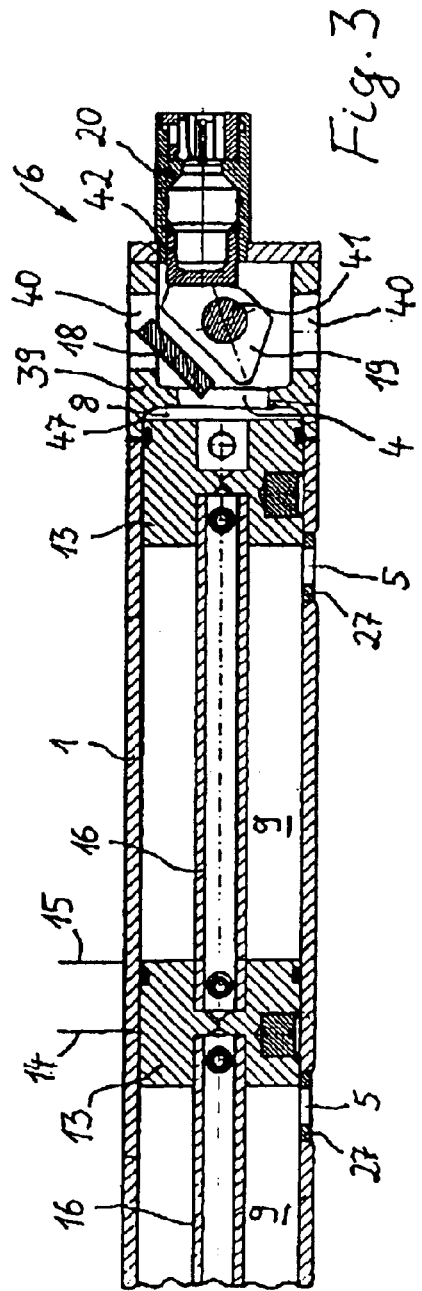
FIG. 3 shows the arrangement of FIG. 2 in the outflow position.

FIG. 3 shows the arrangement according to FIG. 2 in the triggered state. By means of the pyrotechnical actuator 20 the impact piston 42 has been forced against the support element 19 and the sealing disk 18 has been ejected out of the gas outlet opening 4 by the gas pressure in the partial chamber 8 located at the end 21. The gas which was previously contained in the partial chamber 8 at the end 21 can flow through the gas outlet opening 4 as well as through two further outlet openings 40 provided in the trigger housing 39 into the environment. An arrangement with an additional airbag 7 (FIG. 1) connected to the gas outlet opening 4 may be expedient.

By opening the gas outlet opening 4 at the end, the system comprised of the piston 13 and the piston rods 16 is no longer in force equilibrium so that the gas pressure acting on the system moves the system from the rest position 14 shown in FIG. 2 into the outflow position 15 according to FIG. 3.

When this happens, the rated break-off location 29 (FIG. 2) of the sealing sleeves 27 is sheared off so that the peripheral gas outlet openings 5 are connected with the respective partial chambers 9 as a result of which the airbags 7 according to FIG. 1 are filled. The trigger housing 39 welded to the end of the cylindrical peripheral wall 12 has at its inner side a contour with a radius such that in this area the cylindrical center part 11 tapers. In this area, the piston 13 adjoining the partial chamber 8 at the end 21 is secured by means of an edge 47 in that a plastic deformation produced thereat generates a defined braking travel. By adjustment of the cross-sections of the gas outlet opening 4 in the end face and of the outlet openings 40, the movement speed of the piston 13 can be adjusted in a targeted way to the requirements of the airbags 7 (FIG. 1).

Figure 4:
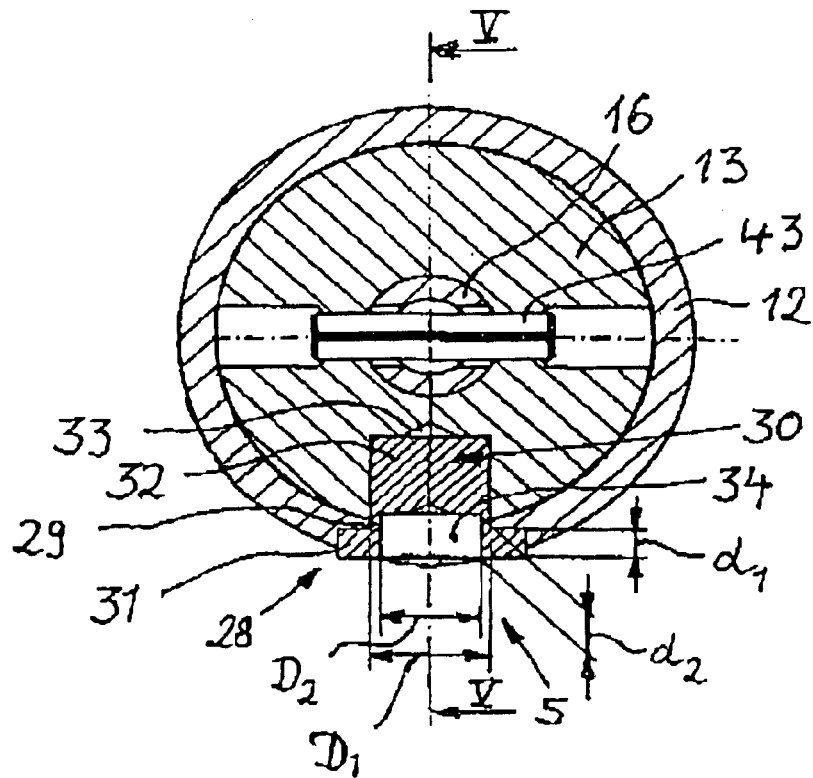
FIG. 4 is a cross-sectional illustration of the cold gas generator in the area of its piston.

FIG. 4 shows a cross-section of the cold gas generator 46 according to FIG. 1 in the area of the piston 13. It is illustrated here that the tubular piston rod 16 is secured centrally in the piston 13 by a clamping pin 43. In the peripheral wall 12 surrounding the piston 13 a sealing sleeve 27 is attached which is comprised of a base body 28 and a closure body 30 which is connected by means of a rated break-off location 29 to the base body 28. The sealing sleeve 27 closes a gas outlet opening 5. The base body 28 is formed as a circular disk 31 which is secured by a sealing weld seam on the peripheral wall 12. The closure body 30 is a cylindrical pin 32 surrounded by a corresponding bore 33 provided in the piston 13. In the circular disk 31, coaxially thereto, an outflow bore 34 is provided whose diameter $D_2$ is somewhat smaller than the diameter $D_1$ of the pin 32. Moreover, the outflow bore 34 has a depth $d_2$ which is somewhat greater than the thickness $d_1$ of the circular disk 31. In this way, an annular rated break-off location 29 is formed.

Figure 5:
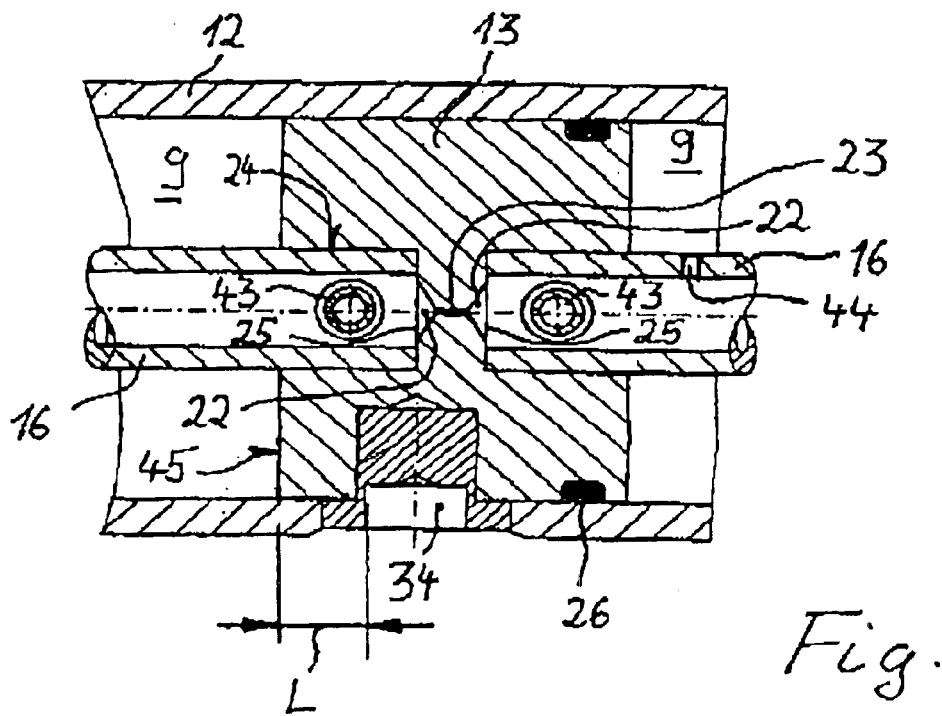
FIG. 5 is a longitudinal section of the area shown in FIG. 4 along the line V-V.

FIG. 5 shows a longitudinal section of the cold gas generator 46 along the line V-V illustrated in FIG. 4. The piston 13 has on both sides a blind bore 24 for receiving the tubular piston rods 16. In the bottom 25 of the blind bores 24 a connecting channel 22 with a flow throttle 23 arranged therein is provided. The tubular piston rods 16 act as a gas line wherein, by means of the pressure compensation bores 44 in the piston rods 16, a connection of the two adjoining partial chambers 9 is provided. Optionally, as a pressure-transmitting connection of the two partial chambers 9, a defined leak arranged between the piston rods 16 and the blind bores 24 containing them or a leak arranged in the area of the clamping pin 43 may be sufficient. The piston 13 is sealed by a peripheral O-ring 26 relative to the cylindrical peripheral wall 12 and has relative to the outlet bore 24 at the side 45 facing away from the outlet position 15 an overlap length L (FIGS. 1 through 3). By adjusting the overlap length L to the outflow bore 34 a defined triggering and filling of the connected airbag 7 (FIG. 1) can be achieved.

While specific embodiments of the invention have been shown and described in detail to illustrate the inventive principles, it will be understood that the invention may be embodied otherwise without departing from such principles.

What is claimed is:

1. A cold gas generator for an airbag system, the cold gas generator comprising:

a storage device (1) having an interior (2) filled with a gas (3) under pressure;

wherein the interior (2) is divided into at least two partial chambers (8, 9);

wherein the at least two partial chambers (8, 9) each have a gas outlet opening (4, 5) closed in a rest state of the cold gas generator and wherein each gas outlet opening is connected to a separate airbag, respectively;

an opening mechanism (6) for actuating all of the gas outlet openings (4, 5) together and for filling simultaneously the gas into the separate airbags (7).

2. A cold gas generator for an airbag system, the cold gas generator comprising:

a storage device (1) having an interior (2) filled with a gas (3) under pressure;

wherein the interior (2) is divided into at least two partial chambers (8, 9);

wherein the at least two partial chambers (8, 9) each have a gas outlet opening (4, 5) closed in a rest state of the cold gas generator and wherein each gas outlet opening is connected to a separate airbag, respectively;

an opening mechanism (6) for actuating all of the gas outlet openings (4, 5) together and for filling simultaneously the gas into the separate airbags (7);

wherein the storage device (1) comprises an approximately cylindrical center part (11) with a cylindrical peripheral wall (12) extending in a longitudinal direction (10) of the storage device (1), wherein the storage device (1) comprises a piston (13) provided in the interior (2) in the area of the center part (11), wherein the piston (13) is moved from a rest position (14) in a direction of the longitudinal axis (10) into an outflow position (15), when the opening mechanism (6) is actuated, and wherein one of the gas outlet openings (5) is provided in the cylindrical peripheral wall and is covered and closed by the piston in the rest position (14) of the piston (13) and is open in the outflow position (15) of the piston (13).

3. A cold gas generator for an airbag system, the cold gas generator comprising:

a storage device (1) having an interior (2) filled with a gas (3) under pressure;

wherein the interior (2) is divided into at least two partial chambers (8, 9);

gas outlet openings (4, 5) closed in a rest state of the cold gas generator, wherein one of the gas outlet openings (4, 5) is correlated with one of the at least two partial chambers (8, 9), respectively;

an opening mechanism (6) for actuating, when needed, all of the gas outlet openings (4, 5) together and for filling several airbags (7) with the gas (3);

wherein the storage device (1) comprises an approximately cylindrical center part (11) with a cylindrical peripheral wall (12) extending in a longitudinal direction (10) of the storage device (1), wherein the storage device (1) comprises several pistons (13) provided in the interior (2), wherein each one of the pistons (13) separates two adjacent ones of the partial chambers (8, 9) from one another, respectively, wherein the pistons (13) are moved from a rest position (14) in a direction of the longitudinal axis (10) into an outflow position (15) when the opening mechanism (6) is actuated, and wherein the gas outlet openings (5) of the partial chambers are closed in the rest position (14) of the pistons (13) and are open in the outflow position (15) and the gas outlet openings each fill one airbag, respectively.

4. The cold gas generator according to claim 3, wherein the storage device (1) further comprises at least one piston rod (16) connecting the pistons (13) to one another.

5. The cold gas generator according to claim 4, wherein the piston rod (16) is tubular.

6. The cold gas generator according to claim 3, wherein the pistons (13) in the rest position (14) are kept in equilibrium by the gas pressure within the storage device (1) and wherein the opening mechanism (6) is configured to act on one of the gas outlet openings (4) arranged at an end (21) of the storage device (1).

7. The cold gas generator according to claim 6, wherein the opening mechanism (6) comprises:

a sealing disk provided with a rated break-off location (17) and configured to close the gas outlet opening (4) arranged at the end of the storage device (1);

a support element (19) supporting the sealing disk (18); and a pyrotechnical actuator (20) acting on the support element (19).

8. The cold gas generator according to claim 6, wherein the peripheral wall (12) has a tapering cross-section in the area of the end (21) of the storage device (1).

9. The cold gas generator according to claim 6, wherein the pistons (13) comprise a connecting channel (22), respectively, for pressure transmission between two of the partial chambers (8, 9) separated by one of the piston (13), respectively, wherein the connecting channel (22) comprises a flow throttle (23).

10. The cold gas generator according to claim 9, wherein the pistons (13) have a blind bore (24), respectively, for receiving the at least one piston rod (16) and wherein the connecting channel (22) is arranged approximately coaxially in a bottom (25) of the blind bore (24).

11. The cold gas generator according to claim 3, wherein the pistons (13) are sealed by an O-ring (26) relative to the peripheral wall (12), respectively.

12. The cold gas generator according to claim 3, wherein the gas outlet openings (5) are arranged in the peripheral wall (12) and are covered by the pistons (13) in the rest position (14).

13. The cold gas generator according to claim 12, wherein the gas outlet openings (5), in the rest position (14) of the pistons (13), are closed by a sealing sleeve (27), respectively, wherein the sealing sleeve (27) is comprised of a base body (28) fastened on the peripheral wall (12) and of a closure body (30) connected by a rated break-off location (29) to the base body (28) and attached to the pistons (13).

14. The cold gas generator according to claim 13, wherein the base body (28) is an approximately circular disk (31) having a thickness ($d_1$), wherein the closure body (30) is a cylindrical pin having a diameter ($D_1$) and formed as a monolithic part coaxially on the circular disk (31), wherein the pin engages a bore (33) provided in the piston (13), and wherein the circular disk (31) has a substantially coaxial outflow bore (34) whose diameter ($D_2$) is somewhat smaller than the diameter ($D_1$) of the pin (32) and whose depth ($d_2$) corresponds approximately at least to the thickness ($d_1$) of the circular disk (31).

15. The cold gas generator according to claim 14, wherein the pistons (13) on a side facing away from the outflow position (15) have an overlap length (L) relative to the outflow bore (34), respectively.

16. The cold gas generator according to claim 3, wherein the gas (3) contained in the interior (2) is primarily helium.

17. A cold gas generator for an airbag system, the cold gas generator comprising:

a storage device (1) having an interior (2) filled with a gas (3) under pressure;

wherein the interior (2) is divided into at least two partial chambers (8, 9);

gas outlet openings (4, 5) closed in a rest state of the cold gas generator, wherein one of the gas outlet openings (4, 5) is correlated with one of the at least two partial chambers (8, 9) respectively;

an opening mechanism (6) for actuating, when needed, all of the gas outlet openings (4, 5) together and for filling several airbags (7) with the gas (3);

wherein the storage device (1) comprises an approximately cylindrical center part (11) with a cylindrical peripheral wall (12) extending in a longitudinal direction (10) of the storage device (1), wherein the storage device (1) comprises a piston (13) provided in the interior (2) in the area of the center part (11), wherein the piston (13) is moved from a rest position (14) in a direction of the longitudinal axis (10) into an outflow position (15), when the opening mechanism (6) is actuated, and wherein one of the gas outlet openings (5) is closed in the rest position (14) of the piston (13) and is open in the outflow position (15) of the piston (13);

wherein the piston (13) in the rest position (14) is kept in equilibrium by the gas pressure within the storage device (1) and wherein the opening mechanism (6) is configured to act on one of the gas outlet openings (4) arranged at an end (21) of the storage device (1).

18. The cold gas generator according to claim 17, wherein the opening mechanism (6) comprises:
   a sealing disk provided with a rated break-off location (17) and configured to close the gas outlet opening (4) arranged at the end of the storage device (1):
   a support element (19) supporting the sealing disk (18); and
   a pyrotechnical actuator (20) acting on the support element (19).

19. The cold gas generator according to claim 17, wherein the peripheral wall (12) has a tapering cross-section in the area of the end (21) of the storage device (1).

20. The cold gas generator according to claim 17, wherein the piston (13) comprises a connecting channel (22), respectively, for pressure transmission between the two partial chambers (8, 9) separated by the piston (13), wherein the connecting channel (22) comprises a flow throttle (23).

21. A cold gas generator for an airbag system, the cold gas generator comprising:
   a storage device (1) having an interior (2) filled with a gas (3) under pressure;
   wherein the interior (2) is divided into at least two partial chambers (8, 9);
   gas outlet openings (4, 5) closed in a rest state of the cold gas generator, wherein one of the gas outlet openings (4, 5) is correlated with one of the at least two partial chambers (8, 9), respectively;
   an opening mechanism (6) for actuating, when needed, all of the gas outlet openings (4, 5) together and for filling several airbags (7) with the gas (3);
   wherein the storage device (1) comprises an approximately cylindrical center part (11) with a cylindrical peripheral wall (12) extending in a longitudinal direction (10) of the storage device (1), wherein the storage device (1) comprises a piston (13) provided in the interior (2) in the area of the center part (11), wherein the piston (13) is moved from a rest position (14) in a direction of the longitudinal axis (10) into an outflow position (15), when the opening mechanism (6) is actuated, and wherein one of the gas outlet openings (5) is closed in the rest position (14) of the piston (13) and is open in the outflow position (15) of the piston (13);
   wherein the piston (13) is sealed by an O-ring (26) relative to the peripheral wall (12).

22. A cold gas generator for an airbag system, the cold gas generator comprising:
   a storage device (1) having an interior (2) filled with a gas (3) under pressure;
   wherein the interior (2) is divided into at least two partial chambers (8, 9);
   gas outlet openings (4, 5) closed in a rest state of the cold gas generator, wherein one of the gas outlet openings (4, 5) is correlated with one of the at least two partial chambers (8, 9), respectively;
   an opening mechanism (6) for actuating, when needed, all of the gas outlet openings (4, 5) together and for filling several airbags (7) with the gas (3);
   wherein the storage device (1) comprises an approximately cylindrical center part (11) with a cylindrical peripheral wall (12) extending in a longitudinal direction (10) of the storage device (1), wherein the storage device (1) comprises a piston (13) provided in the interior (2) in the area of the center part (11), wherein the piston (13) is moved from a rest position (14) in a direction of the longitudinal axis (10) into an outflow position (15), when the opening mechanism (6) is actuated, and wherein one of the gas outlet openings (5) is closed in the rest position (14) of the piston (13) and is open in the outflow position (15) of the piston (13);
   wherein the gas outlet opening (5) is arranged in the peripheral wall (12) and covered by the piston (13) in the rest position (14).

23. The cold gas generator according to claim 22, wherein the gas outlet opening (5), in the rest position (14) of the piston (13), is closed by a sealing sleeve (27), wherein the sealing sleeve (27) is comprised of a base body (28) fastened on the peripheral wall (12) and of a closure body (30) connected by a rated break-off location (29) to the base body (28) and attached to the piston (13).

24. The cold gas generator according to claim 23, wherein the base body (28) is an approximately circular disk (31) having a thickness ($d_1$), wherein the closure body (30) is a cylindrical pin having a diameter ($D_1$) and formed as a monolithic part coaxially on the circular disk (31), wherein the pin engages a bore (33) provided in the piston (13), and wherein the circular disk (31) has a substantially coaxial outflow bore (34) whose diameter ($D_2$) is somewhat smaller than the diameter ($D_1$) of the pin (32) and whose depth ($d_2$) corresponds approximately at least to the thickness ($d_1$) of the circular disk (31).

25. The cold gas generator according to claim 24, wherein the piston (13) on a side facing away from the outflow position (15) has an overlap length (L) relative to the outflow bore (34).

* * * * *